US012332363B2

(12) United States Patent
Lemaire et al.

(10) Patent No.: US 12,332,363 B2
(45) Date of Patent: Jun. 17, 2025

(54) METHODS FOR GEOSPATIAL POSITIONING AND PORTABLE POSITIONING DEVICES THEREOF

(71) Applicant: Trimble Inc., Sunnyvale, CA (US)

(72) Inventors: Charles Lemaire, Carquefou (FR); Clement Fouquet, Joinvelle le Pont (FR)

(73) Assignee: Trimble Inc., Westminster, CO (US)

( * ) Notice: Subject to any disclaimer, the term of this patent is extended or adjusted under 35 U.S.C. 154(b) by 504 days.

(21) Appl. No.: 17/545,809

(22) Filed: Dec. 8, 2021

(65) Prior Publication Data
US 2022/0187476 A1 Jun. 16, 2022

(30) Foreign Application Priority Data

Dec. 16, 2020 (EP) .................................... 20290084

(51) Int. Cl.
*G01S 19/47* (2010.01)
*G06F 18/214* (2023.01)
(Continued)

(52) U.S. Cl.
CPC ............ *G01S 19/47* (2013.01); *G06F 18/214* (2023.01); *G06F 18/251* (2023.01); *G06N 3/08* (2013.01);
(Continued)

(58) Field of Classification Search
CPC ........ G01S 19/47; G01S 19/53; G01S 19/485; G06F 18/214; G06F 18/251; G06N 3/08;
(Continued)

(56) References Cited

U.S. PATENT DOCUMENTS

2011/0235923 A1* 9/2011 Weisenburger ........ G01C 15/00
382/201
2011/0279311 A1* 11/2011 Hamano ........... G06F 16/24575
707/769
(Continued)

OTHER PUBLICATIONS

D. Hoiem et al., Representations and Techniques for 3D Object Recognition and Scene Interpretation, Synthesis Lectures on Artificial Intelligence and Machine Learning, vol. 5(5), p. 1-169, http://dhoiem.cs.illinois.edu/publications/HoiemSavareseFinal.pdf (Year: 2011).*
(Continued)

*Primary Examiner* — Vladimir Magloire
*Assistant Examiner* — Fred H Mull
(74) *Attorney, Agent, or Firm* — Kilpatrick Townsend & Stockton LLP

(57) ABSTRACT

According to some embodiments of the present disclosure, there is provided a method and a positioning device for determining a geospatial position and a nature of an object. The method may include capturing, by an imaging device of the positioning device, at least one image of a surface. The captured image may be processed for identifying at least one candidate object in the surface and for determining a nature of the candidate object. Further, the method may include displaying the captured image with a selection mechanism for assisting in selection of the candidate object, wherein the captured image is displayed with an indication of the determined nature of the candidate object. The method may then include receiving an input via the selection mechanism for selection of at least one of the at least one candidate object. Further, the method may include collecting data from a global navigation satellite system (GNSS) receiving unit of the positioning device and data from the imaging device for a plurality of positions of the positioning device at which the selected object is viewed by the imaging device. The col-
(Continued)

lected data may then be used for determining orientations and positions of the positioning device for the plurality of positions of the positioning device in a global coordinate system, followed by determining the geospatial position of the selected object in the global coordinate system based on the determined orientations and positions of the positioning device in the global coordinate system.

18 Claims, 6 Drawing Sheets

(51) Int. Cl.
    *G06F 18/25*    (2023.01)
    *G06N 3/08*    (2023.01)
    *G06T 7/32*    (2017.01)
    *G06T 7/70*    (2017.01)
    *G06T 17/05*    (2011.01)
    *G06V 10/82*    (2022.01)

(52) U.S. Cl.
    CPC ............... *G06T 7/32* (2017.01); *G06T 7/70* (2017.01); *G06T 17/05* (2013.01); *G06V 10/82* (2022.01)

(58) Field of Classification Search
    CPC .. G06T 7/32; G06T 7/70; G06T 17/05; G06T 7/73; G06T 7/74; G06V 10/82; G01C 15/00; G01C 11/00–36
    See application file for complete search history.

(56) References Cited

U.S. PATENT DOCUMENTS

| | | | |
|---|---|---|---|
| 2016/0189405 A1* | 6/2016 | Lyons | G06T 11/60 345/592 |
| 2018/0018013 A1* | 1/2018 | Fukuchi | G06F 3/005 |
| 2018/0172840 A1* | 6/2018 | Fenton | G01C 11/06 |
| 2019/0197778 A1* | 6/2019 | Sachdeva | G06F 18/251 |
| 2019/0271780 A1* | 9/2019 | Bravo Orellana | G06T 7/579 |
| 2019/0375103 A1* | 12/2019 | Cui | G06V 20/10 |
| 2020/0025943 A1 | 1/2020 | Lemaire | |
| 2020/0082544 A1* | 3/2020 | Zhu | G06V 10/25 |
| 2020/0284607 A1* | 9/2020 | Mangal | G01C 21/3647 |
| 2020/0349362 A1 | 11/2020 | Maloney | |
| 2021/0397839 A1* | 12/2021 | Qiu | G06T 7/73 |
| 2022/0189039 A1* | 6/2022 | Viguier | G01C 3/08 |

OTHER PUBLICATIONS

Extended European Search Report for Application No. 20290084.1-1206, mailed Jun. 4, 2021, 11 pages.

\* cited by examiner

METHODS FOR GEOSPATIAL POSITIONING AND PORTABLE POSITIONING DEVICES THEREOF

CROSS-REFERENCE TO RELATED APPLICATIONS

This application claims priority to European Application No. 20290084.1, filed Dec. 16, 2020, the contents of which are incorporated herein by reference in their entirety for all purposes.

TECHNICAL FIELD

The present disclosure relates generally to the field of positioning and more particularly to methods for geospatial positioning and portable positioning devices adapted to obtain a geospatial position of an object. Methods and positioning devices disclosed herein may provide a three-dimensional geospatial position of the object.

BACKGROUND

Positioning relates to the art of determining the position of a person, object or system on, or near, the surface of the Earth, i.e. the art of determining the coordinates of a location (latitude, longitude and altitude). Positioning may be of interest in for example the technical field of surveying, whose purpose is to e.g. establish land maps based on the determination of terrestrial or three-dimensional position of points using the relative distances and angles between these points. In such an application the resulting land map will be dependent on the absolute position of the surveying system, a component of the surveying system or a surveyed object, as may be determined by a positioning device using signals received from a global navigation satellite system (GNSS).

The position of a terrain point may for example be obtained by means of a survey pole equipped with a pointing tip to place the survey pole at the terrain point of interest and with a GNSS antenna having a so-called "phase centre" at which satellite information signals are received. The survey pole may also be equipped with a tilt sensor to level the survey pole so that it is ensured that the phase centre of the antenna is vertical over the terrain point. Levelling the pole may however take time and/or be imprecise. Further, as the satellite information signals are received at the phase centre of the GNSS antenna, compensation for the length of the pole is necessary to compute the three-dimensional position of the terrain point.

Such survey poles are commonly used in surveying applications. However, for such applications and other, there is still a need of providing new and improved positioning devices. In particular there is a need of providing more compact positioning devices.

SUMMARY

It is therefore an object of the present invention to overcome at least some of the above-mentioned drawbacks, and to provide an improved method and/or an improved positioning device for obtaining a geospatial position of an object.

This and other objects are achieved by means of a method and a positioning device as defined in the appended independent claims. Other embodiments are defined by the dependent claims.

According to some embodiments of the present disclosure there is provided a method for determining a geospatial position and a nature of an object. The method may include capturing, by an imaging device of a positioning device, at least one image of a surface. The captured image may be processed for identifying at least one candidate object in the surface and for determining a nature of the candidate object. Further, the method may include displaying the captured image with a selection mechanism for assisting in selection of the candidate object, wherein the captured image is displayed with an indication of the determined nature of the candidate object. The method may then include receiving an input via the selection mechanism for selection of at least one of the at least one candidate object. Further, the method may include collecting data from a global navigation satellite system (GNSS) receiving unit of the positioning device and data from the imaging device for a plurality of positions of the positioning device at which the selected object is viewed by the imaging device. The collected data may then be used for determining orientations and positions of the positioning device for the plurality of positions of the positioning device in a global coordinate system, followed by determining the geospatial position of the selected object in the global coordinate system based on the determined orientations and positions of the positioning device in the global coordinate system.

According to some embodiments of the present disclosure, a portable position device adapted to obtain a geospatial position of an object is provided. The portable position device comprises a global navigation satellite system (GNSS) receiving unit adapted to receive satellite information signals from a GNSS, and an imaging device adapted to capture at least one image of a scene including the object.

The positioning device further includes a display unit adapted to display one or more images captured by the imaging device and a selection mechanism for assisting in selection of an object among at least one candidate object in the one or more displayed image. The selection mechanism may for example include that some or all the candidate objects are marked in the displayed image. Further, the selection mechanism may include a means for the user to interact with the displayed image to indicate the selection, for example by clicking or tapping on the selected object (in case the display unit includes a touch screen).

Further, the positioning device may include a processing unit configured to process at least one image captured by the imaging device for identifying at least one candidate object in the scene and for determining a nature of the at least one candidate object. Further, the processing unit may be configured to cause displaying, at the display unit, of the at least one captured image with the selection mechanism, wherein the at least one captured image includes an indication of the determined nature of the at least one candidate object, and to receive an input from the selection mechanism about selection of at least one of the at least one candidate object.

The processing unit may further be configured to cause the collection of data from the GNSS receiving unit and data from the imaging device for a plurality of positions of the positioning device at which the selected object is viewed by the imaging device, to determine, based on the collected data, orientations and positions of the positioning device for the plurality of positions of the positioning device in a global coordinate system, and to determine the geospatial position of the selected object in the global coordinate system based on the determined orientations and positions of the positioning device in the global coordinate system.

The embodiments of the present disclosure rely on two main steps. In a first main step, at least one object in the captured image is selected from one or several candidate objects. In a second main step, the absolute orientations and positions of the positioning device, i.e., the orientations and positions of the positioning device in the global coordinate system, are determined for a number of positions of the positioning device at which the selected object is viewed by the imaging device.

For the first main step, at least one image of the surface may be acquired by the imaging device and processed for identifying one or several candidate objects and for determining the nature of the candidate object(s). As will be further explained in the following, the image may be processed using computer-aided analysis means, in which features of objects in the image may be compared with features of known objects in previously captured images. The determined nature of the at least one identified candidate object may then be displayed with a selection mechanism for assisting a user in the selection of the at least one identified candidate object.

Thus, the present embodiments make use of machine learning to facilitate the selection of the object of interest, i.e., the object for which the geospatial position is to be determined, by identifying one or several candidate objects and presenting the determined nature of the respective candidate objects to the user. This is to be contrasted with techniques wherein the user is required to point at the object using for example a laser pointer, a laser rangefinder or other pointing techniques in order to identify the object (or point) of interest. This is even more in contrast with prior art techniques in which a surveying pole needs to be placed on the object or point of interest and levelled before any measurement can be performed. The present embodiments therefore provide a more user-friendly method and device for obtaining position of objects of interest.

The present embodiments provide also the benefits that the user is presented with a suggestion of the nature of the object to be georeferenced, thereby avoiding the user to search in different lists or categories for the nature of the object, which may be time consuming.

According to the present embodiments, the user may be presented with a plurality of candidate objects that may have been identified in a prior processing step. These candidate objects may be regarded as automatically generated suggestions helping the user in his or her selection of the object(s). Further, the nature of the candidate objects may be displayed. Further, the user may be provided with the option of correcting the nature of an identified candidate object in case the nature is wrong. Further, the user may also be provided with the possibility of defining or selecting a subgroup within the nature of the object. For example, if the nature of the object is determined to be an air vent, it may be possible for the user to further specify the type of air vent according to a subgroup of the more general group of air vents.

Optionally, the user may specify a certain nature, and then be presented with a reduced list of candidate objects belonging to that specific nature. The processor of the device may thus be adapted to present such a reduced list of candidate objects based on a received input about a specific nature. This option presents the advantage of reducing the number of candidate objects among which the user has to select the desired object and of avoiding a surplus of candidate objects displayed on the screen (in case the device would be able to identify too many candidate objects). Alternatively, the processor may provide the possibility of selecting a desired nature after recognition of all of the candidate objects by the device such that the list of candidate objects is subsequently reduced to a list of objects corresponding to the desired nature.

Further, the present embodiments allow for computer aided analysis tools such as e.g. artificial neural networks to be used, which may be trained on previously captured images of objects and hence improved over time. In other words, the identification of candidate objects in the captured image and the determination of their corresponding nature may be performed using a self-learning process.

In the second main step, the absolute orientations and positions of the positioning device are determined for a number of positions of the positioning device. For this second main step, data may be collected from a number of detectors of the positioning device for determining the orientation and the position of the positioning device for each one of a plurality of positions of the positioning device. The collected data may include data from the GNSS receiving unit (i.e. coordinates in the global coordinate system) and data from the imaging device (i.e. images).

For example, the data may be collected during a limited time period, or within a certain time interval, during which the operator orients the positioning device towards the surface, or scene, including the object, such that the data for determining the orientations and positions of the positioning device are collected for different locations at which the object may be photographed.

As will be further explained in the following, data for determining the orientations and positions of the positioning device for a plurality of positions (or locations) of the positioning device may be collected from the GNSS receiving unit. The collected data may be processed for estimating the orientation and position of the positioning device in the global coordinate system when capturing each one of the at least one image. As it is possible to know the position and orientation of the positioning device in the global coordinate system for the positions at which the selected object is viewed by the positioning device, it is then possible to determine the geospatial position of the object.

Thus, the present method relies on the use of a GNSS receiving unit and an imaging device for determining the geospatial position of an object and has the benefit of not requiring any levelling procedure. The present method does not either necessitate a pole with a pointing tip, which usually is heavy and cumbersome. As such, the method may be implemented in a positioning device which is lighter and more compact. The method for determining the geospatial position of an object and the positioning device thereof present the benefit of being contactless in the sense that a physical contact between the positioning device and the object is not necessary. Further, the positioning device may be portable, and may in particular be handheld like a smartphone or the like.

The accuracy of the determined geospatial position may depend on different factors such as the accuracy of the GNSS board (or GNSS receiver). However, using a GNSS board with a centimetre-level precision, a geospatial position with a centimeter accuracy can be obtained. Other factors affecting the accuracy of the calculated geospatial position may for example include the mechanical tolerances in the arrangement of the GNSS antenna relative to the imaging device. A calibration procedure may be performed to calibrate the positioning device and thereby compensate for, or at least reduce, the effect of these variations. Each positioning device may have its own calibration model.

Further, it will be appreciated that the satellite information signals are received at a phase center of the GNSS antenna.

To improve the accuracy of the measurement, the GNSS antenna may be arranged to be positioned horizontally while capturing images of the scene. For this purpose, the positioning device may, in some embodiments, be equipped with a stabilization device to maintain the GNSS antenna in a horizontal position.

The nature of a target object (or object of interest) and its position may then be stored in a database, which may be used for land mapping. In other words, new maps or updated maps may be provided with the object and its associated nature marked on the maps. The present embodiments are beneficial in that they provide a more efficient method for determining the nature and position of objects for the purpose of producing such maps.

The determination of the geospatial position of the object may be achieved by selecting a point of interest on the object and determining the geospatial position of that specific point. The point of interest may also be referred to as an anchor point, which may be identified in the images captured at different positions of the positioning device. The position of the anchor point may be considered to represent the position of the entire object. Expressed differently, the object may be modelized by an anchor point whose position will be determined by the positioning device in lieu of the position of the object. Advantageously, the point of interest or anchor point may comprise a preferably unique feature or signature that facilitates identification and tracking of the object as it is viewed by the imaging device from different positions. In the following, the determination of the geospatial position of the object may be referred to as the determination of the geospatial position of an anchor point associated with the object.

The identification of candidate objects may be understood as an extraction of features from the captured image, wherein the features may be associated with objects on the imaged surface or scene that the processing unit of the device can recognize based on previously captured images and knowledge of objects identified on such previously captured images (e.g. as entered by a user of the device). The identification may result in a list of individual objects and their position in the image, together with a nature of the respective objects. The identified objects, or a subgroup of identified objects, may then be displayed with an indication of the determined nature.

The term "nature" may be understood as a classification, category or type by which objects included in a viewed surface or scene can be divided into subgroups. Examples of natures may include manhole covers (or parts thereof), air vents (or parts thereof), curbsides (or part thereof), and the like. By determining the nature of the identified objects, candidate objects belonging to a specific nature, such as e.g. "air vents" can be indicated in the displayed image.

It is appreciated that the processing unit in some embodiments may be an integrated part of the positioning device while, in other embodiments, the processing unit may be arranged at a remote device or a remote server, for example located within an internet cloud structure.

According to an embodiment, the geospatial position of the selected object (or anchor point associated with the object, as mentioned above) may be determined continuously as the data are collected. For example, the GNSS data and the data from the imaging device may be continuously collected as the operator moves the positioning device over the surface or scene including the selected object and continuously processed by the processing unit for determining geospatial position of the object (or its associated anchor point). In one scenario, the operator may walk over a surface including the object while holding the positioning device such that the positioning device records data at different locations.

Hence, it will be appreciated that a series of images of a scene, surface or environment including the object may be captured with (or using) the imaging device. The series of images may in some embodiments be a captured video including the object (or at least the anchor point associated with the object).

According to an embodiment, the geospatial position of the selected object, or the anchor point associated with the object, may be determined based on a determination of the geospatial position of the selected object (or anchor point) for at least some of a plurality of locations from which data are collected from the GNSS receiving unit and the imaging device. Hence, it is appreciated that it is not necessary to determine the geospatial position based on collected data from all the captured images. A subset of locations may suffice. Further, should the selected object (or its associated anchor point) temporarily disappear, or should it be for some reasons not possible to identify the selected object (or its associated anchor point) in a captured image, the tracking of the geospatial position of the selected object may be paused and resume when the object becomes visible/possible to identify again. Alternatively, any captured images not including the selected object (or in which the selected object cannot be identified) may be discarded.

According to an embodiment, the determination of the geospatial position of the selected object (or its associated anchor point) may be stopped on a condition that an accuracy of the determined geospatial position of the selected object (or its associated anchor point) is reached. Further, the operator may be provided with an indication that the geospatial position has been determined with a sufficient accuracy, so that the operator can stop moving the positioning device to different positions and thereby end the measurement process. According to an embodiment, the indication to stop the collection of data may be displayed to the user. The indication may for example include the determined geospatial position of the selected object, or instructions to stop the collection of data.

By stopping the determination of the geospatial position of the selected object (or its associated anchor point) when a desired or predetermined accuracy has been reached the cycle time of the positioning process may be reduced.

According to an embodiment, the nature of the at least one candidate object may be determined using an artificial neural network trained on previously captured images of objects and the corresponding nature of objects. Thus, the present embodiment employs neural network technology (also referred to as artificial intelligence, AI, or machine learning) as a tool to improve the processing of the captured image to identify the candidate object and its corresponding nature. The neural network may be trained on previously captured images, in which candidate objects and their nature may have been identified manually by a human, such as an operator of the positioning device.

According to an embodiment, the artificial neural network may be updated by communicating with a server configured to receive images and information about the nature of objects identified in the received images. This allows for the positioning device, or the processing of the captured image, to be automatically updated or calibrated.

According to an embodiment, the captured image may be transmitted to the server together with information about the nature of the candidate object or with information that no candidate object has been identified in the captured image.

This information may be used to further improve and train the artificial neural network and to improve the accuracy of the identification of candidate objects and the corresponding nature.

Examples of artificial neural networks may include deep convolutional neural networks (DCNN).

According to an embodiment, input may be received from an operator for correction of the determined nature of a candidate object, and the determined nature may be corrected accordingly. The input may advantageously be provided to a server, for example in a post-process manner, i.e. when the device is connected to the server and possibly after measurements have been made with the device. The server may house the artificial neural network and use the input to update the artificial neural network. Additionally, or alternatively, the input may be used to update an artificial neural network stored locally in the positioning device.

It will be appreciated that the artificial neural network in some examples may be downloaded to the positioning device from a remote location, such as for example a remote server of an internet cloud infrastructure. Further, the artificial neural network stored on the positioning device may be replaced with newer versions, which in some examples may have been improved by input received from one or more positioning devices. Thus, data generated by the usage of the positioning device may be provided as input for training the artificial neural network and eventually improve the method and the device.

According to an embodiment, a subset of a plurality of identified candidate objects may be determined according to a predefined nature and displayed with the selection mechanism. The user is hence not presented with all identified candidate objects, but a predefined subset to facilitate selection of one of the candidate objects. The predefined nature may be defined by the user, preferably by means of input to a user interface (which may be provided via the display unit as a touch screen for example).

The determined geospatial position and nature of the selected object may be stored in the positioning device, and/or transmitted to a computing device.

As previously mentioned, data from the imaging device and the GNSS receiving unit may be collected for a plurality of positions of the positioning device. Thus, a series of images of a scene, surface or environment including the object may be captured with (or using) the imaging device. According to some embodiments, the method includes orientating the series of captured images with respect to each other and generating a three-dimensional (3D) reconstruction of the scene, surface or environment using the orientated series of captured images.

Further, the method may comprise obtaining positions of an antenna of the GNSS receiving unit in the global coordinate system for at least a subset of the captured images based on satellite information signals received at the GNSS antenna. In other words, positions of the antenna in the global coordinate system are determined for at least a subset of the captured images. It will be appreciated that it is not necessary to determine the (3D) positions of the antenna in the global coordinate system for all of the captured images. Thus, in some embodiments, the subset may include only some of the captured images while, in other embodiments, the subset may include all of the captured images. A first list with the 3D positions of the antenna in the global coordinate system for some of the captured images (the subset) is then obtained.

Further, the method may comprise the steps of (arbitrarily) defining a local coordinate system and determining positions of the imaging device for at least some images of the subset in the local coordinate system. The position of the positioning device, or rather the position of the imaging device of the positioning device, may then be determined in this arbitrary local coordinate system, which is fixed. As a result, a second list with the 3D positions of the imaging device in the local coordinate system for at least some images of the subset is obtained.

As an example, the arbitrary local coordinate system may be a coordinate system centered at the position of the imaging device (or even more precisely the position of a projection center of the imaging device) when capturing one of the images. The position of the imaging device in this local coordinate system may be determined for some or all the other images captured by the imaging device. This is only one illustrative example and the arbitrary local coordinate system does not need to be centered at the imaging device or its center.

The method may then comprise the step of determining a transformation function correlating a (3D) position of a point in the global coordinate system with a (3D) position of a point in the local coordinate system based on a known spatial position of the GNSS antenna relative to the imaging device within the positioning device when capturing each of the images of the subset, the determined positions of the antenna in the global coordinate system and the corresponding positions of the imaging device in the local coordinate system for the images of the subset, or at least some of them. The known spatial relationship between the GNSS antenna and the imaging device may also be referred to as the antenna offset in the following. In other words, based on the first list of positions of the antenna in the GNSS, the second list of positions of the imaging device in the local coordinate system for at least some images of the subset, and the antenna offset, a transformation function between the global coordinate system and the local coordinate system can be established.

It will be appreciated that the satellite information signals are received at the GNSS antenna of the receiving unit and, thus, the 3D positions computed by the GNSS receiving unit, or a processing unit of the positioning device, based on the received signals correspond to the geospatial position of the GNSS antenna. For this reason, the transformation function depends on the antenna offset, i.e. a known spatial position of the imaging device relative to the GNSS antenna (or vice versa) within the positioning device for the images of the subset.

In some embodiments, the spatial position of the imaging device relative to the GNSS antenna may vary from one image to another and thus, the known relative spatial relationship between the imaging device and the GNSS antenna may be different from one image to another. However, in some other embodiments or configurations, the imaging device may be arranged at a fixed position relative to the GNSS antenna within the positioning device such that the antenna offset is always the same. Regardless of whether the spatial position of the antenna relative to the imaging device when capturing each one of the images is fixed or varies, the positioning device may be configured such that said relative spatial position is known when capturing each one of the images.

Further, the antenna offset may be determined as the position of the phase center of the GNSS antenna relative to a principal point (such as the center of a lens or the center of the image sensor of) the imaging device. However, the antenna offset may be determined using other points.

It will be appreciated that the transformation function determines three translations (along three axes X, Y and Z), three rotations (the pitch, the roll and the yaw) and a scale representative of the relationship between the global coordinate system (the absolute coordinate system, as defined by the GNSS), and the local coordinate system as arbitrarily defined by the positioning device. The transformation function enables the conversion of the coordinates of a point in the local coordinate system to its coordinates in the absolute coordinate system, or vice versa.

According to an embodiment, determining the geospatial position of the object (or its associated anchor point) in the global coordinate system may include determining the position of the object in the local coordinate system, and then determining the geospatial position of the object in the global coordinate system based on the determined position of the object in the local coordinate system and the determined transformation function.

The present embodiments of determining the position of a selected object is based on the use of data collected at a GNSS receiving unit and images captured at an imaging device. In particular, the method relies on the use of a transformation function to correlate a position in the global coordinate system with a position in a local coordinate system arbitrarily defined by the positioning device. The transformation function is obtained based on the 3D positions of the antenna in the global coordinate system (the first list), the corresponding 3D positions of the imaging device in the local coordinate system (the second list) while capturing a number of images (or video) of the surface or scene and a known spatial relationship between the imaging device and the antenna within the positioning device. In other words, for one of the captured images, the first list provides the position of the antenna in the global coordinate system while the second list provides the position of the imaging device in the arbitrary local coordinate system. From a 3D reconstruction of the scene, as obtained by the captured images, the 3D position of a point on the object in the 3D reconstruction may be determined in the local coordinate system and then be converted into a 3D position in the absolute coordinate system using the transformation function.

Embodiments based on photogrammetric techniques for automatic identification of candidate objects and their corresponding nature, for example involving machine learning or template matching, may be used. The identified candidate objects may be displayed with an indication of their nature to assist the operator in the selection. The user may then also verify that the nature of the object is correct and would not need to search for the right nature or category among a plurality of categories. It will be appreciated that the candidate object may for example be an object or template with a particular (or unique) marking or pattern intentionally placed in the scene such that the object can be identified using for example template matching, wherein a specific candidate object or template (of a particular pattern, shape or geometry) is looked for in a captured image.

Optionally, the collected data may according to an embodiment include data from an inertial measurement unit, IMU, of the positioning device. The IMU data may include acceleration and gyroscopic data and may be collected for the plurality of positions of the position device at which the object is viewed. The collected IMU data may be provided for further improving the accuracy when determining the orientations and positions of the positioning device for the plurality of positions of the positioning device in the global coordinate system.

According to some embodiments, the portable positioning device may comprise a body including a first portion for holding the positioning device (for example by hand, such as a smartphone) and a second portion in which at least the GNSS antenna (or the GNSS receiving unit) is arranged. The imaging device may be mounted in for example the first portion.

In some embodiments, the first portion and the second portion may be mounted at a fixed angle with respect to each other. With the imaging device being arranged in the first portion, the antenna offset may be fixed.

In an embodiment, the first portion may be connected to the second portion by means of a hinge to allow the second portion to swing with respect to the first portion. The structural configuration of the positioning device may therefore vary from an unfolded configuration to a folded configuration in which the first portion comes against the second portion. In the present embodiment, the antenna offset may vary from the capture of one image to another. The present embodiment presents the benefit of providing some flexibility for capturing images which would be difficult to obtain with a fixed (unfolded) configuration of the positioning device. It may also provide some flexibility for the operator in holding the positioning device.

In some embodiments, the portable positioning device may be implemented based on an existing device including a processing unit and, optionally, a display unit, to which a module including the GNSS receiving unit with its antenna and the imaging device is added. In other embodiments based on an existing device including also an imaging device and, optionally, an IMU, the add-on module may only include a GNSS receiving unit. The positioning device and/or the processing unit may then be adapted to operate in accordance with a method as defined in any one of the preceding embodiments.

It will be appreciated that the processing unit may also be referred to as a data collector, a data processor or control unit as the same unit may have the function of computing the geospatial position of the selected object and the function of controlling the IMU, the display unit and/or the imaging device, for example. In some other embodiments, these functions may be located in separate units.

According to an embodiment, the determination of the geospatial position of the object (or its associated anchor point) includes:
orientating a series of images of a scene,
generating a 3D reconstruction of the scene using the orientated images,
defining an arbitrary local coordinate system,
determining a first set of positions from which at least some of the images have been captured in the local coordinate system,
obtaining a second set of positions corresponding to the geospatial positions of the portable positioning device in a global coordinate system for said at least some images,
determining a transformation function correlating a position of a point in the global coordinate system with a position of a point in the local coordinate system based on a known spatial position of the point from which an image has been captured in the positioning device relative to the point at which the geospatial position of the portable positioning device is obtained for each of said at least some images, the first set of positions and the second set of positions,
identifying an anchor point associated with an object of interest in the generated 3D reconstruction of the scene, determining the position of the anchor point in the local coordinate system, and determining the geospatial position of the anchor point in the global coordinate system based on the determined position of the anchor point in the local coordinate system and the determined transformation function.

According to some embodiments of the present disclosure, there is provided a computer program product comprising computer-executable components for performing a method according to any one of the preceding embodiments when the computer-executable components are executed on a processing unit.

According to some embodiments, there is provided a computer-readable digital storage medium comprising a computer program product comprising computer-executable components adapted to, when executed on a processing unit, perform a method according to any one of preceding embodiments.

It is noted that other embodiments using all possible combinations of features recited in the above described embodiments may be envisaged. Thus, the present disclosure also relates to all possible combinations of features mentioned herein. Any embodiment described herein may be combinable with other embodiments also described herein, and the present disclosure relates to all combinations of features.

DESCRIPTION OF THE DRAWINGS

Exemplifying embodiments will now be described in more detail, with reference to the following appended drawings.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
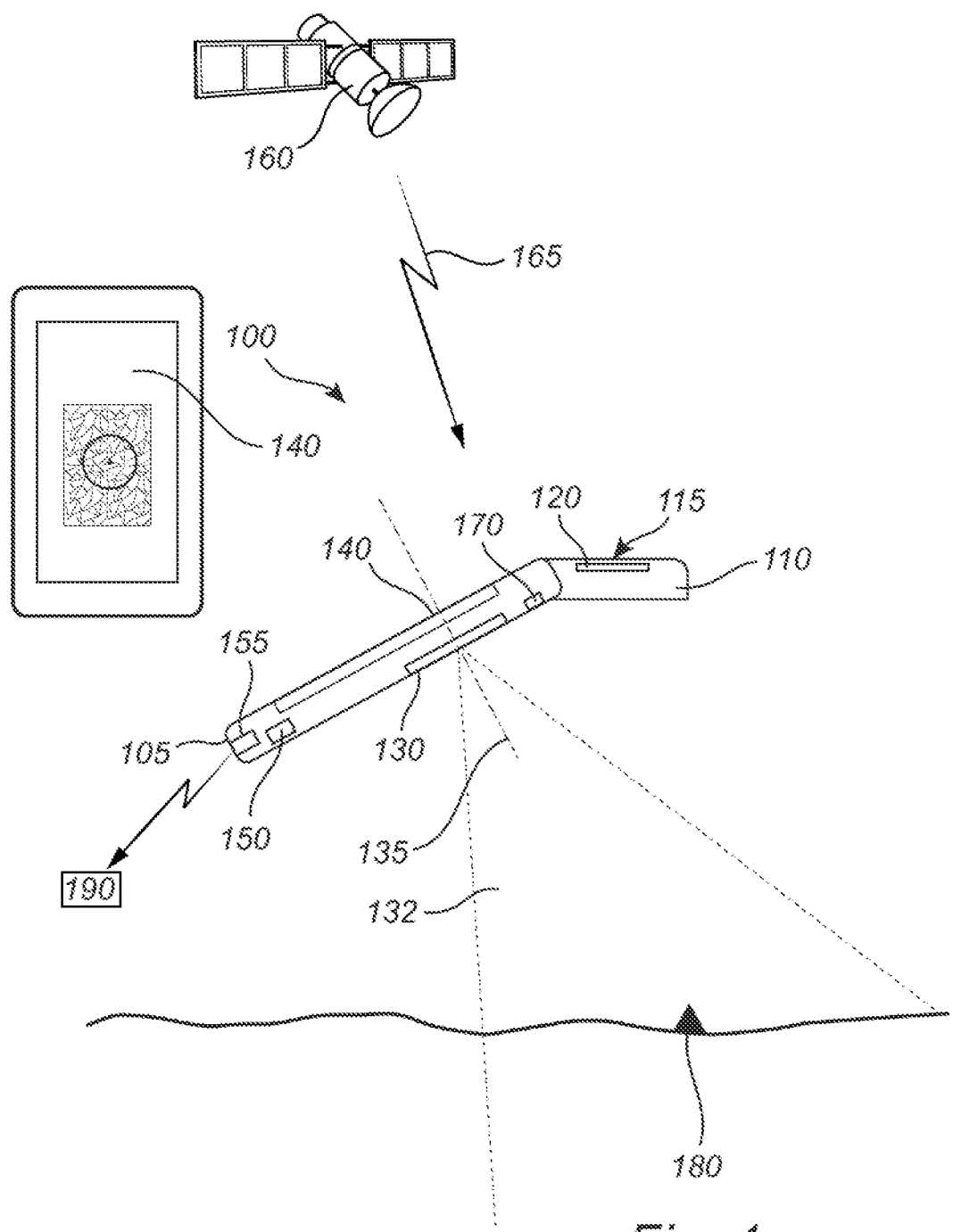
FIG. 1 shows a schematic view of a portable positioning device adapted to determine the geospatial position of a point of interest in accordance with some embodiments.

With reference to FIG. 1, a portable positioning device 100 according to some embodiments of the present disclosure is described. FIG. 1 shows a portable positioning device 100 that may comprise a GNSS receiving unit 110 including an antenna 120, an imaging device 130, a display unit 140, an optional inertial measurement unit, IMU, or a number of optional gyroscope and accelerometers 170, a processing unit 150 and a transmitter 155.

The antenna 120 may have a phase center 115 and may be adapted to receive satellite information signals from a GNSS. One satellite 160 of the GNSS is depicted in FIG. 1 for illustration purposes. The antenna 120 may be adapted to receive signals from four or more space-based orbiting sources (or satellites) of the GNSS. The antenna 120 may for example include an antenna patch, a ceramic element, a low noise amplifier and filters. The GNSS antenna 120 may be lodged within a housing of the positioning device 100.

The GNSS signals may for example be received from any GNSS such as GPS, GLONASS, Galileo, Compass/Beidou, QZSS, SBAS, IRNSS or the like. The antenna 120 may also be referred to as the GNSS antenna 120. The antenna 120 may be connected, or may be part of, a GNSS receiver or GNSS receiver unit or GNSS board 110. In some embodiments, the GNSS receiving unit 110 may include the GNSS antenna 120 and a processing unit, or processor, for computing a position of the antenna in the GNSS based on the signals received at the antenna. In some other embodiments, the processing unit of the receiving unit may be part of the processing unit 150 of the positioning device 100. The GNSS receiving unit 110 may therefore be adapted to transmit to the processing unit 150 of the positioning device 100 either the satellite information signals received at the antenna 120 or a position computed based on the received signals.

The basic operation principle of a GNSS receiver, or positioning device based on GNSS signals in general, is to calculate its position by precisely timing the signals sent by satellites of the GNSS. Each of the messages broadcasted by the satellites includes a time stamp indicating the time the message was transmitted from the satellite and the satellite position when the message was transmitted. A distance to each of the satellites may then be derived based on the transit time of each message and the speed of light. Computation of these distances may result in the location (two- or three-dimensional position) of the positioning device, or in the present case the phase-center 115 of the antenna 120 of the positioning device 100.

The imaging device 130 of the positioning device 100 is arranged at a certain position relative to the GNSS antenna 120 in the positioning device 100. In the present embodiment, the imaging device 130 is not aligned with the antenna 120 of the positioning device 100. The imaging device 130 may have an optical axis 135 as determined by, for example, the axis or line along which there is rotational symmetry in the imaging device 130. The optical axis 135 of the imaging device 130 may for example correspond to the axis passing through the center of a lens of the imaging device 130 or the axis passing through the center of the image sensor (not specifically shown in FIG. 1) of the imaging device 130. The optical axis 135 of the imaging device 130 may, in some embodiments, but not necessarily, correspond to the line of sight of the imaging device 130, which may also be referred to as the sighting axis. Although not necessary, the phase center 115 of the GNSS antenna 120 may, in some embodiments, be arranged along the optical axis 135 of the imaging device 130.

The imaging device 130 may for example be a digital camera including an image sensor such as a semiconductor charge-coupled device (CCD), a complementary metal-oxide-semiconductor (CMOS) sensor or another active digital pixel sensor.

The display unit 140 of the positioning device 100 may be provided for assisting an operator of the portable positioning device 100 in capturing a series of images of a surface or scene including an object 180 within a field of view 132 of the imaging device 130. The display unit 140 may also be used for assisting in identifying, or selecting, an object in the scene, as will be further explained with reference to FIGS. 3A and B. FIG. 1 shows also a front view of the display unit 140 in which an image of the scene, in this example the ground, within the field of view 132 of the imaging device 130 is displayed. For illustration purposes, the object 180 is represented by a triangle in the image displayed in the display unit 140.

The IMU 170 may be adapted to provide acceleration and gyroscopic data about the positioning device 100.

The processing unit 150 may be in communication with the imaging device 130, the GNSS receiving unit 110, the display unit 140 and, optionally, the IMU 170. The IMU 170 may be employed to provide acceleration and gyroscopic data about the position device 100. The processing unit 150 may in particular be adapted to receive GNSS signals (or satellite information signals) from the GNSS receiving unit 110 or, as the case may be, directly a position of the GNSS antenna 120 of the GNSS receiving unit 110 as computed by the GNSS receiving unit 110.

Further, the processing unit 150 may be adapted to control the imaging device 130 to cause the capture of one or more images of a surface including the object 180. The processing unit 150 may also be adapted to receive the images, or at least data corresponding to the images, captured by the imaging device 130, and further to control the images displayed by the display unit 140 and to receive information entered by an operator via the display unit 140.

In other words, the positioning device 100 may comprise a processing unit 150 and two or more types of sensors, in the present example the imaging device 130, the GNSS receiving unit 110 and optionally the IMU 170. The display unit 140 may be used to display information and/or to receive information.

As will be described in the following, a geospatial position of an object 180, or a point of interest on the object, which may also be referred to as an anchor point associated with the object, may be determined based on data collected at the GNSS receiving unit and images captured with the imaging device 130.

FIG. 1 also shows remote device, such as a server 190 in communication with the positioning device 100. The server may be configured to receive images and information about the nature of objects identified in the images captured by the imaging device 130. Further, the server may store an artificial neural network that may be used for identifying candidate objects and their corresponding nature in the images captured by the imaging device. This will be discussed in more detail in connection with FIGS. 3A and B.

Further, although the server 190 is shown to be at a remote location, such as for example a remote server of an internet cloud infrastructure, the server 190 may be an integrated part of the positioning device 100.

In the following, a procedure based on data collected at the GNSS receiving unit 110 and the imaging device 130 for determining a geospatial position of the point of interest 180 is described with reference to FIGS. 2-4.

Figure 2:
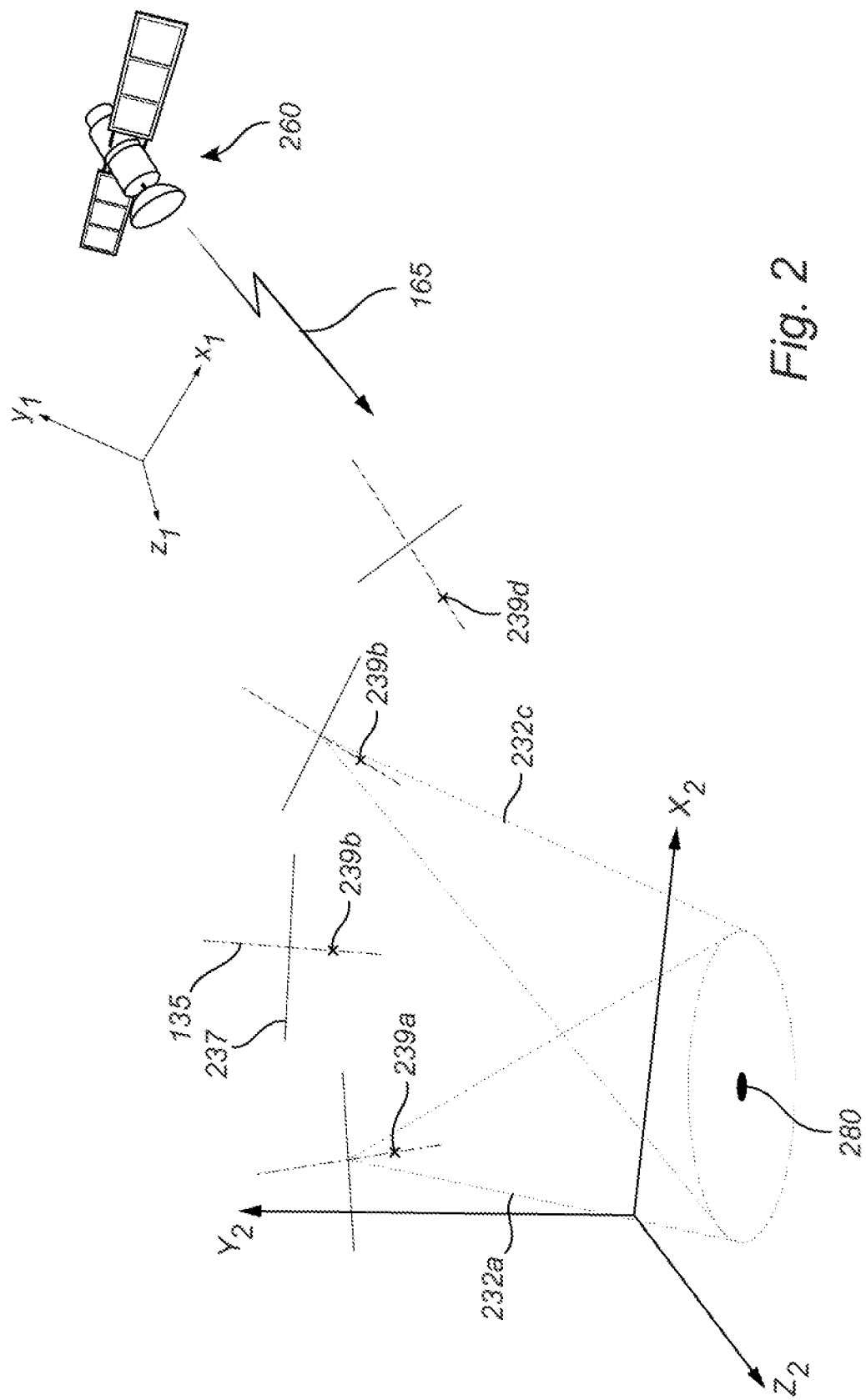
FIG. 2 illustrates at least part of a workflow, or scenario, of a method for determining the geospatial position of a point of interest, in accordance with some embodiments.

FIG. 2 illustrates an embodiment of at least part of a workflow of a method for determining the geospatial position of an object (or a point of interest associated with this object) using a portable positioning device such as for example the positioning device 100 described with reference to FIG. 1.

FIG. 2 shows a scenario in which the positioning device 100 is placed at four different positions at which the object 280 is viewed by the imaging device 130 while data from the GNSS receiving unit 110 is collected together with data from the imaging device 130. For illustration purposes, only a part of the positioning device 100 is represented in FIG. 2. In particular, the positioning device is represented by a plane 237 which may correspond to the image chip (or image sensor) in the imaging device 130 of the positioning device 100.

In the embodiment shown in FIG. 2, the processing unit 150 of the positioning device 100 may cause the capture of four images of the scene or surface at which the object 280 is located, as represented by the zones 232a and 232c of the field of view of the imaging sensor 237. For this purpose, an operator may move at different places and capture a series of images, such as four in the present example, of the object. The four different locations at which the four images are captured may correspond to the positions 239a, 239b, 239c and 239d of the projection center of the imaging device 130 (the lens being not shown in FIG. 2). It will be appreciated that another point of the imaging device may be taken as a reference such as for example the center of the imaging sensor 237.

The positioning device 100, or rather the processing unit 150, may define an arbitrary local coordinate system ($X_2$, $Y_2$, $Z_2$). As illustrated in FIG. 2, the arbitrary coordinate system does not need to be centered at one of the positions 239a, 239b, 239c or 239d of the imaging device 130 from which the images are captured. It will be appreciated that the positions 239a, 239b, 239c and 239d are arbitrary selected by the operator of the positioning device 100 when capturing the images, or a video, of the scene and the positions of the imaging device in the arbitrary coordinate system ($X_2$, $Y_2$, $Z_2$) for the four different images are thus, as such, not known at the beginning of the method.

FIG. 2 shows also only one satellite 260 from which GNSS signals 265 may be sent to an GNSS antenna (not shown in FIG. 2) of the positioning device 100. As mentioned above, the GNSS receiving unit may receive signals from four or more satellites and the signals may be computed to determine the position of the phase center of the antenna 120 of the positioning device 100 in an absolute coordinate system ($X_1$, $Y_1$, $Z_1$) relating to the GNSS.

An example of the identification of at least one candidate object in the surface and the determination of the nature of the at least one candidate object, in accordance with some embodiments, will now be discussed with reference to FIGS. 3A and 3B.

Figure 3A:
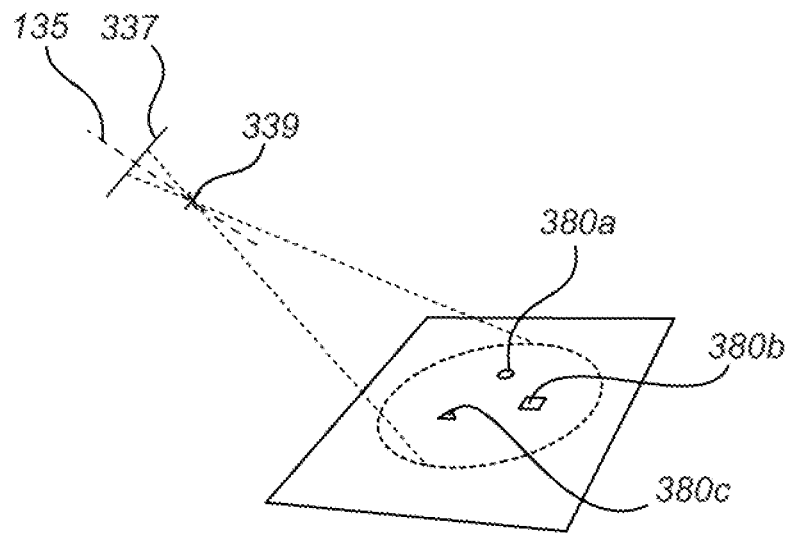
FIG. 3A shows the capturing of an image including several candidate objects, in accordance with some embodiments.
Figure 4:
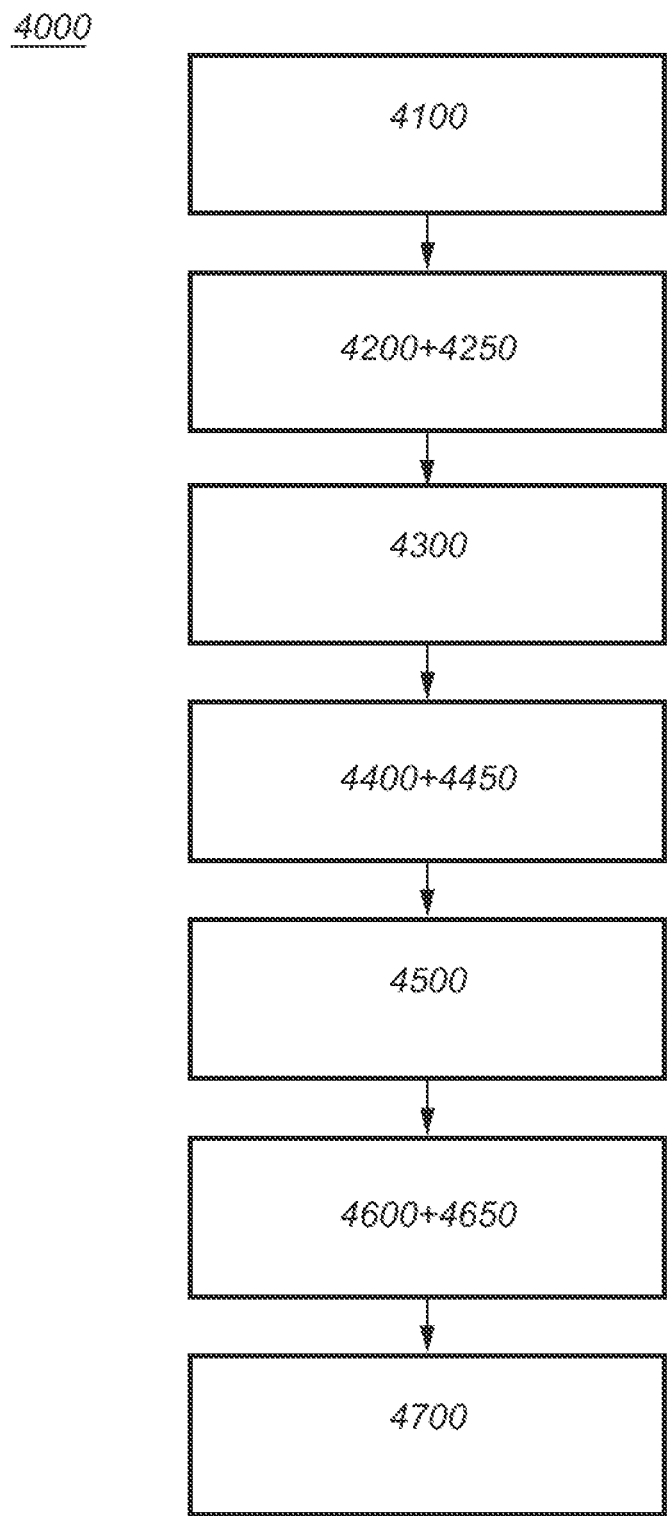
FIG. 4 shows a flow chart illustrating a general overview of a method for determining the geospatial position of an object (or point of interest) in accordance with some embodiments.

FIG. 3A shows a scenario in which the positioning device 100 is placed at a position for capturing an image of a surface or scene. Similar to FIG. 2, only a part of the positioning device 100 is represented in FIG. 3A. In particular, the positioning device is represented by a plane 337 which may correspond to the image chip (or image sensor) in the imaging device 130 of the positioning device 100. The location at which the image is captured may correspond to the position 339 of the projection center of the imaging device 130 (similar to FIG. 2 the lens is not shown in FIG. 3A).

In the present example, the imaged surface may include three candidate objects which for illustration purposes are schematically represented by a respective geometric shape: a circle 380a, a square 380b and a triangle 380c. It is however appreciated that the actual candidate objects may include other structures and features as well. Such structures and features may be placed in the scene for the purpose of the geospatial positioning or be naturally occurring parts of the scene or surface. Further, it is appreciated that the scene or surface may form part of the terrain, such as the ground surface, or another environment imaged by the imaging device. Examples objects may include manhole covers, air vents, curbsides and the like, which all may be part of the surface or positioned on the surface.

The positioning device 100, which for example may be a handheld device, may be directed towards the surface by an operator such that the imaging device 130 of the positioning device 100 is allowed to capture an image of the surface. The captured image may then be processed for identifying the candidate objects 380a, 380b, 380 in the surface and determining their respective nature.

Figure 3B:
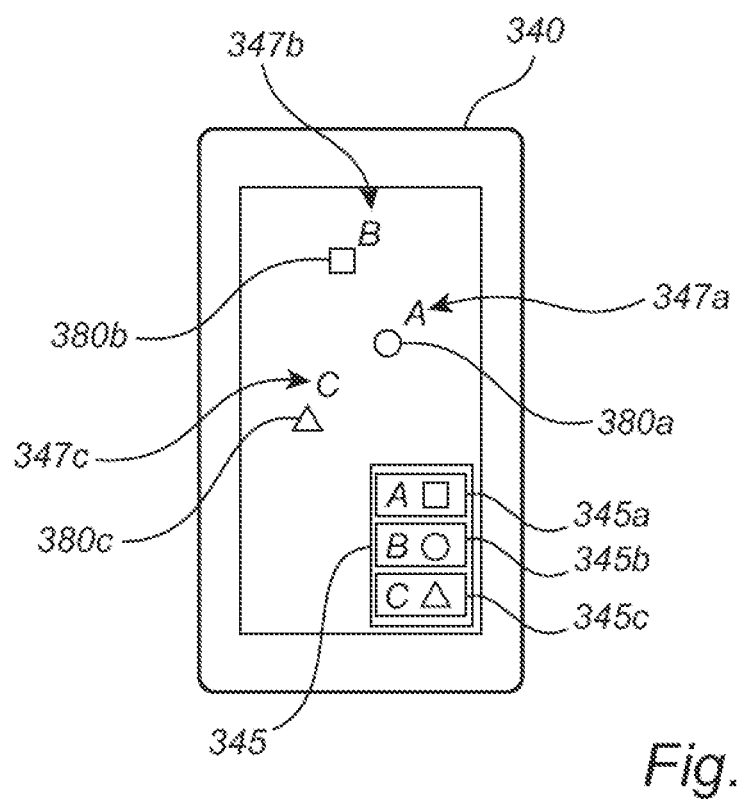
FIG. 3B shows an example of a captured image displayed with a selection mechanism and indication of the determined nature of the candidate objects, in accordance with an embodiment.

An example of a result of the processing is illustrated in FIG. 3B, in which the captured image is shown on a display unit 340 of the positioning device 100 together with an indication 347a, 347b, 347c of the determined nature of the respective candidate objects 380a, 380b, 380c as well as a selection mechanism 145 for assisting in selection of at least one of the candidate objects 380a, 380b, 380c. In the present example, the indications of the nature of the candidate objects 380a, 380b, 380c are represented by the letters "A", "B" and "C", wherein the letter "A" indicates the nature of the candidate object 380a represented by the circle, the letter "B" indicates the nature of the candidate object 380b represented by the square and the letter "C" indicates the nature of the candidate object 380c represented by the triangle. These examples are merely illustrative, and other candidate features may be associated with natures such as for example "manhole cover", "air vent", "curbside" etc.

The selection mechanism 345 may be displayed with the image for assisting in the selection of one or several of the candidate objects 380a, 380b, 380c. The selection mechanism 345 may for example include a listing of the determined natures of the candidate objects 380a, 380b, 380c, wherein each item on the list may show the indication of the determined nature ("A", "B", "C") and a graphical representation of the respective candidate object (such as the geometric shapes in FIG. 3B, a text label or the like).

The selection mechanism 345 may assist in the selection of a candidate object 380a, 380b, 380c in several different ways. In one example, the user may select a specific candidate object by for example touching (or coming close to it with a finger) or tapping on the selected object on the screen or a representation of the selected object. The selection mechanism 345 may in these cases comprise selectable labels, tags or list items displaying the identity and/or nature of specific candidate objects. Alternatively, the user can select the specific candidate object by entering information corresponding to an identity of the selected candidate object.

In another example, the user may in a first step select a desired nature, and then a specific candidate object associated with the selected nature. Thus, the user may for example select nature "B", whereupon only candidate objects that have been determined by the processing unit as belonging to nature "B" are indicated in the displayed image. The user may then select a desired object among the subgroup of candidate objects indicated as nature "B" objects. In the example illustrated in FIG. 3B, the user may select item 345b of the selection mechanism 345, which is associated with nature "B", whereupon only the candidate object 380b (represented by the square) is indicated by the indication 347b. The user may then select the candidate object 380b by tapping on item 345b of the selection mechanism 345, or by tapping directly on the candidate objected 380b or the corresponding indication 347b. Hence, the selection mechanism 345 may facilitate selection of candidate object 380a, 380b, 380c by allowing the user to be presented with a reduced number of candidate objects 380a, 380b, 380c, such that only the candidate objects belonging to a selected nature are presented as selectable options.

Alternatively, the user may select a desired nature after being presented with the (full) list of candidate objects so that a reduced list of candidate objects associated with the selected nature is subsequently displayed.

The selection mechanism 345 may be configured to receive input from the user for selection of a candidate object 380a, 380b, 380c by means of a touch screen functionality, which allows the user to tap on the selected candidate object 380a, 380b, 380c or indication 347 of the determined nature. Other input means are however also conceivable, including pointing devices, buttons, text input fields, eye-tracking devices and the like.

The processing of the captured image may include computer aided analysis for identifying the candidate objects 380a, 380b, 380c and for determining the respective nature of the identified candidate objects 380a, 380b, 380c. The candidate objects 380a, 380b, 380c may for example be identified by comparing features in the captured image with features of known objects in previously captured images. The identification of the candidate objects 380a, 380b, 380c and, preferably, the determination of their respective nature, may for example be performed using an artificial neural network model trained on previously captured images. The artificial neural network model may be stored on the server 190 shown in FIG. 1, which may be configured to receive captured images and information about objects identified in the images. The artificial neural network may in some examples be downloaded from the server 190 and stored locally on the positioning device 100, wherein in other examples the neural network may operate from the server 190.

According to an embodiment, the captured image is sent as input to the server 190 storing the artificial neural network, which processes the image for identifying candidate objects in the imaged surface, in this case the three candidate objects 380a, 380b, 380c shown in FIG. 3B. The server 190 may then provide the results of the artificial neural network processing, i.e., the identified candidate objects 380a, 380b, 380c and preferably their determined nature, to the display unit 340. The display unit then displays the captured image with an indication 347a, 347b, 347c of the determined nature of the candidate objects 380a, 380b, 380c.

Should the user find that the determined nature of a candidate object 380a, 380b, 380c is incorrect, the user may correct the nature and cause the corrected information to be displayed on the image. The correction may then be transmitted to the server 190 for updating the artificial neural network.

A method for determining the geospatial position of an object according to some embodiments will now be discussed with reference to the flow chart of FIG. 4. As illustrated, the method includes a step 4100 of capturing, or causing the capture of, a series of images of the scene in which the object 180, 280 is located. Step 4100 corresponds for example to the scenario depicted in FIG. 2 wherein four images are taken at four different positions of the positioning device 100. It will be appreciated that the use of four images is just an example.

At 4200, the captured images may then be orientated with respect to each other and a three-dimensional (3D) reconstruction of the scene may be generated, at 4250, using the orientated series of captured images.

It will be appreciated that the captured images may be orientated in real time in the sense that they are successively orientated as they are captured. It is therefore not necessary to wait until all images have been captured. Further, the orientation of the images may, as such, not be static in that the orientation of an already orientated image may be refined, or readjusted, based on newly captured images.

Different techniques may be employed for orientating the images of the scene captured by the imaging device.

According to an embodiment, the captured images may be orientated by identifying common characteristic features among the captured images and/or by using a structure from motion, SFM, technique, which is a photogrammetric technique for estimating three-dimensional structures from two-dimensional image sequences that may be coupled with local motion signals. It is however appreciated that other photogrammetric techniques may also be used, allowing images to be oriented with respect to each other based on the content of the captured images themselves. Based on a recognition of characteristic features in the captured images, for example based on contrast/brightness values representative of different levels of light reflectivity of the objects of the scene, the images may be orientated.

Turning to the example illustrated in FIG. 2, the series of images may not necessarily be captured in the order defined by the positions 239a, 239b, 239c and 239d of the imaging device 130. Assuming that the images are captured in a different order, for example in a sequence at positions 239a, 239c, 239d and 239b, such photogrammetric techniques enable to orientate the images with respect to each other by recognizing characteristic features between the images. It will also be appreciated that it is beneficial if the images to be orientated with respect to each other overlap.

According to an embodiment, if the positioning device 100 includes an IMU 170, the captured images may be orientated at 4200 based on acceleration and gyroscopic data received from the IMU 170 of the positioning device 100. In other words, in this embodiment, the images may be orientated based on data representative of the motion of the imaging device between the capture of different images instead of being based on the content of the images themselves. For example, from a first position of the IMU 170 when capturing the first image, the acceleration and gyroscopic data obtained from the IMU 170 enable to know the relative position of the imaging device when the next image is captured. Based on the data obtained by the IMU 170 for the series of captured images, the images can be orientated with respect to each other.

Further, although the position of the imaging device 130 is represented to be fixed with respect to the position of the IMU 170 in the positioning device 100 shown in FIG. 1, the imaging device 130 may, in some other embodiments, be arranged in a movable or adjustable manner relative to the IMU 170 in the positioning device 100. In this case, the spatial position of the imaging device 130 relative to the IMU 170 may vary from the capture of one image to another.

The position of the imaging device 130 relative to the IMU 170 may be known, for example using some kind of encoder (angle detector) of the positioning device or the like, and the observation of the IMU 170 for the different images may be corrected accordingly.

Further, the observations of the IMU 170 when capturing the series of images may be used in combination with photogrammetric techniques for orientating the images in order to improve the orientation of the images.

As mentioned above, the processing unit 150 may then be adapted, at 4250, to generate a 3D reconstruction of the scene based on the orientated series of images. The 3D reconstruction may for example be displayed at the display unit 140 of the positioning device 100.

Turning again to FIG. 4, at 4300, positions of the antenna 120 in the global coordinate system for at least a subset of the captured images may be determined based on satellite information signals received at the GNSS antenna 120. In the present example, the 3D positions of the antenna 120 in the global coordinate system may be determined for at least three or four of the captured images. Accordingly, a first list with the 3D positions of the antenna in the global coordinate system for some of the captured images (the subset) is obtained.

Further, the processing unit 190 may at 4400 define an arbitrary local coordinate system $(X_2, Y_2, Z_2)$, which is fixed with respect to the absolute coordinate system $(X_1, Y_1, Z_1)$ of the GNSS and may at 4450 determine the positions of the imaging device for at least some of the captured images, such as for example three or four of the images in the present example, in the local coordinate system $(X_2, Y_2, Z_2)$.

As for the orientation of the images captured by the imaging device 130, the position of the imaging device 130 in the local coordinate system $(X_2, Y_2, Z_2)$ for three or more of the images may be determined by photogrammetry based on the generated 3D reconstruction, using for example a triangulation technique, and/or based on acceleration and/or gyroscopic data received from the IMU 170 of the positioning device 100.

As a result, a second list with the 3D positions of the imaging device in the local coordinate system for at least some images of the subset is obtained.

The processing unit 150 may then at 4500 determine a transformation function correlating a position of a point in the global coordinate system $(X_1, Y_1, Z_1)$ with a position of a point in the local coordinate system $(X_2, Y_2, Z_2)$ based on the determined 3D positions of the antenna 120 in the global coordinate system, the corresponding positions of the imaging device 130 in the local coordinate system $(X_2, Y_2, Z_2)$ for the images of the subset and a known spatial position of the imaging device 130 relative to the GNSS antenna 120 within the positioning device 100 for the captured images (the antenna offset). Although the spatial position of the imaging device relative to the GNSS antenna may vary from one image to another, in the present example the known spatial position of the imaging device 130 relative to the GNSS antenna 120 within the positioning device 100 is the same.

In other words, the first list of 3D positions of the antenna in the global coordinate system, the second list of 3D positions of the imaging device in the local coordinate system for at least some images of the subset, and the known spatial position of the antenna relative to the imaging device within the portable positioning device when capturing each one of the images are used by the processing unit to establish the transformation function between the global coordinate system (the absolute coordinate system) and the local coordinate system.

It will be appreciated that at least three non-identical images, and in particular non-collinear (i.e. not taken along the same sighting axis), may be used for the purpose of determining the transformation function for correlating the position of a point in the local coordinate system with the position of a point in the absolute coordinate system.

The processing unit 150 may receive input (e.g. from the selection mechanism 345) such that the processing unit 150 can identify at 4600 the selected object among the candidate objects 380a, 380b, 380c in the generated 3D reconstruction of the scene and determine at 4650 the 3D position of the selected object (or point of interest on the selected object) in the local coordinate system based on the generated 3D reconstruction. The geospatial position of the selected object in the global coordinate system may then be determined at 4700 based on the determined 3D position of the selected object in the local coordinate system and the determined transformation function.

The geospatial position of the selected object may be its three-dimensional position in the global coordinate system but may also include only a two-dimensional position or only the altitude, as desired.

As already mentioned, in some embodiments, the series of captured images may be a captured video of the scene including the selected object.

It is noted that the object may not necessarily be located in one of the images for which the position of the GNSS antenna has been obtained and/or for which the position of the imaging device has been determined. As long as the object is located in the 3D reconstruction, the position of the object in the local coordinate system can be determined by photogrammetry and its absolute position can be determined using the transformation function.

Figure 5:
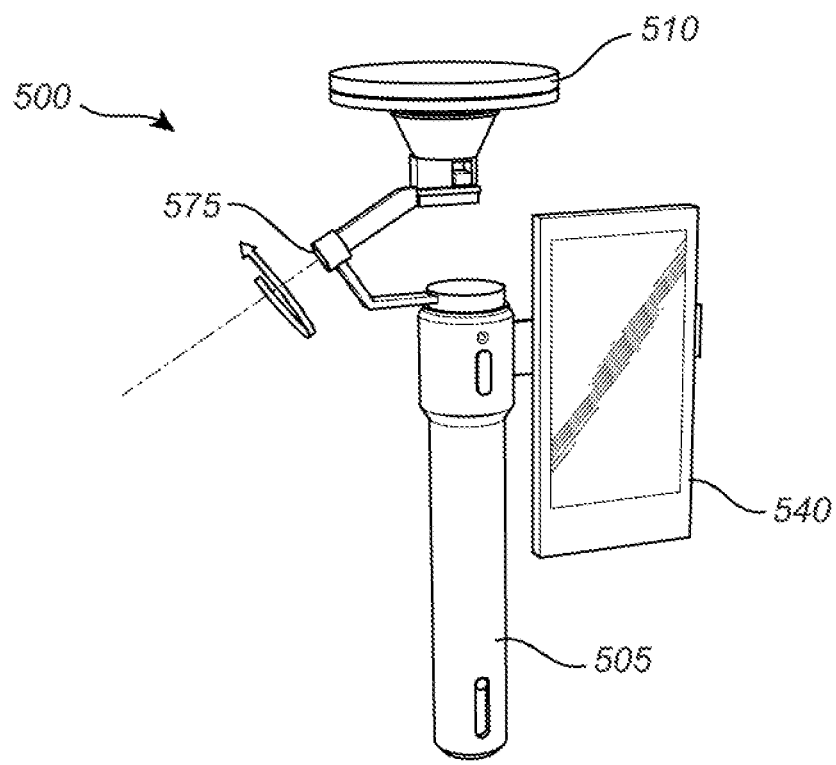
FIG. 5 shows a schematic view of a portable positioning device in accordance with an embodiment.

With reference to FIG. 5, a positioning device in accordance with another embodiment is described.

FIG. 5 shows a portable positioning device 500 including a GNSS receiving unit 510 and a display unit 540. The portable positioning device 500 includes also a body 505 in which the processing unit (not shown) of the positioning device 500 may be arranged. Alternatively, the processing unit of the positioning device may be arranged in the same unit as the display unit, such as for example at the backside of the display unit 540. In the embodiment shown in FIG. 5, the body 505 is in the form of a cylinder which may be convenient to be handheld by an operator. However, other geometries and arrangements may be envisaged.

In some embodiments, the element denoted 540 in FIG. 5 may be a smartphone including a display unit 540, a processing unit and an imaging device (not shown in this view). In the present example, the positioning device 500 may include the body 505 and a holder, or holding element (not denoted), attached to the body 505 and adapted to receive a unit including an imaging device, a display unit and a processing unit, such as e.g. a smartphone.

Generally, the processing unit, the imaging device, the display unit, the GNSS receiving unit and the IMU of the positioning device 500 may be equivalent, on a functional point of view, to the processing unit 150, the imaging device 130, the display unit 140, the GNSS receiving unit 110 and the IMU 170 of the positioning device 100 described with reference to FIGS. 1-4. The characteristics described in the preceding embodiments for these elements therefore apply to the present embodiment.

In the present embodiment, the GNSS receiving unit 510, or at least its antenna, is arranged to be positioned horizontally. For this purpose, the positioning device 500 may be equipped with a stabilization device 575 to maintain the GNSS in a horizontal position. In the present example, the stabilization device 575 may comprise a tilt sensor for detecting a deviation of the antenna of the GNSS receiving unit 510 from horizontal and a motorized system for rotating the GNSS receiving unit 510 such that it is maintained in a horizontal position.

FIG. 5 illustrates also embodiments of the present disclosure in which the portable positioning device may be implemented based on an existing device 540 already including a processing unit, an imaging device and, optionally, a display unit, to which a module including the GNSS receiving unit is added. Expressed differently, embodiments of the present disclosure include an add-on module only including a GNSS receiving unit with its antenna, in which the processing unit of the existing device is adapted to operate in accordance with a method as defined in any one of the preceding embodiments.

Figure 6:
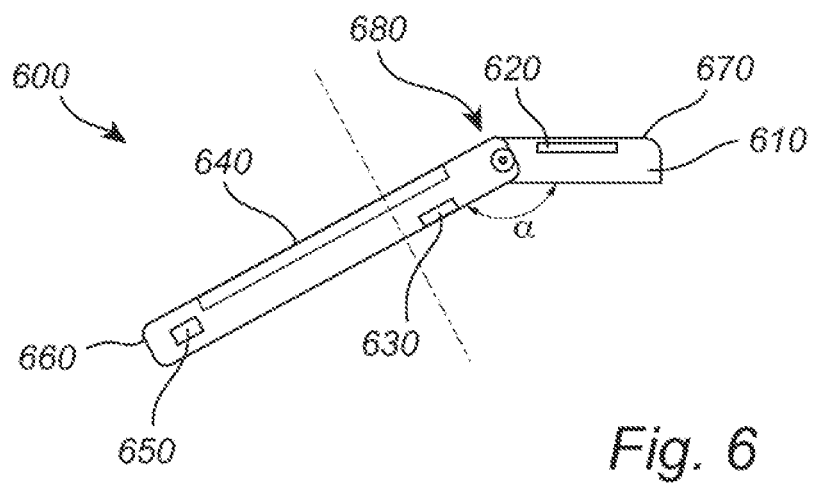
FIG. 6 shows a schematic view of a portable positioning device in accordance with another embodiment.

FIG. 6 shows a schematic view of a portable positioning device 600 in accordance with another embodiment.

The portable positioning device 600 may comprise a body including a first portion 660 for holding the positioning device (for example by hand, such as a smartphone) and a second portion 670 in which at least the GNSS antenna (or the GNSS receiving unit) is arranged. The imaging device 630 may be provided in the first portion 660.

In the present embodiment, the first portion 660 and the second portion 670 are not mounted at a fixed angle with respect to each other but, instead, the first portion 660 is connected to the second portion 670 by means of a hinge 680 to allow the second portion 670 to swing or rotate with respect to the first portion 660. The rotation of the second portion 670 about the hinge 680 is represented by the angle α formed between the first portion 660 and the second portion 670. The structural configuration of the positioning device 600 may therefore vary from an unfolded configuration, in which the angle α is different from zero, and a folded configuration in which the first portion 660 comes against the second portion 670 such that the angle α is equal to, or at least close to, zero.

Figure 7:
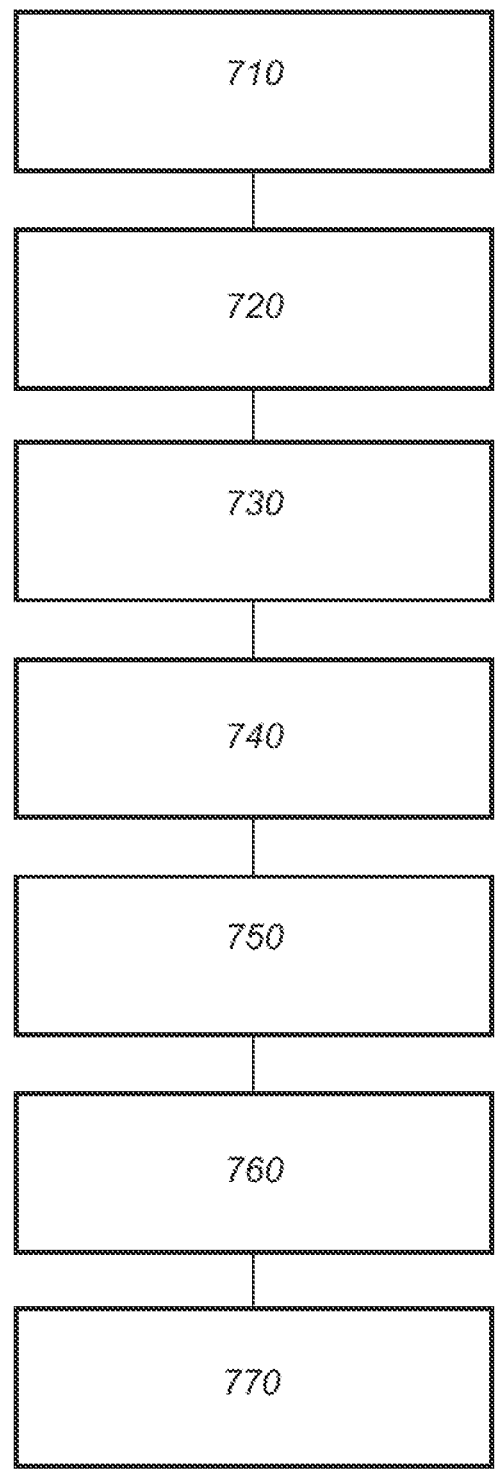
FIG. 7 is a flow chart illustrating the methods of the present disclosure.

Referring to FIGS. 1 and 7, a method for determining a geospatial position of a point of interest in accordance with some embodiments is described.

The method comprises capturing 710, by an imaging device 130 of the positioning device, at least one image of a surface or scene including the object, and processing 720, by a processing unit 150, the at least one captured image for identifying at least one candidate object in the surface and for determining a nature of the at least one candidate object.

The method may then comprise displaying 730 the at least one captured image with a selection mechanism for assisting in selection of at least one of the at least one candidate object, wherein the at least one captured image is displayed with an indication of the determined nature of the at least one candidate object.

Further, the method may comprise, at 740, receiving an input via the selection mechanism for selection of at least one of the at least one candidate object.

At 750, the method comprises collecting data from a global navigation satellite system (GNSS) receiving unit 110 of the positioning device and data from the imaging device for a plurality of positions of the positioning device at which the selected object is viewed by the imaging device. The data may be collected by a data collector or the processing unit

150. The method then comprises determining 760, based on the collected data, orientations and positions of the positioning device for the plurality of positions of the positioning device in a global coordinate system (X1, Y1, Z1), and determining 770 the geospatial position of the selected object in the global coordinate system based on the determined orientations and positions of the positioning device in the global coordinate system.

The person skilled in the art realizes that the present invention by no means is limited to the preferred embodiments described above. On the contrary, many modifications and variations are possible within the scope of the appended claims.

For example, the positioning device may include a plurality of imaging devices in order to improve its orientation in the surrounding of the object. Using a plurality of imaging devices provides the benefit of providing an image covering a larger portion of the surrounding for each one of the locations at which the positioning device is held by the user (i.e. without being limited to the field of view of a single imaging device). For each of the plurality of positions of the positioning device in the vicinity of the object, the imaging device(s) may be configured to provide a panoramic view or an image with an extended field of view to cover at least more than one direction.

It will be appreciated for example that the object does not necessarily need to be a terrain object or a terrain point. The present method and the positioning device thereof provide the benefit that the point of interest may be located anywhere, i.e. may be any point or object in a scene or environment captured by the imaging device in the series of images. For example, the object may be located on the ground, on a wall, above the operator or elevated such as a feature of a roof of a building.

Although features and elements are described above in particular combinations, each feature or element can be used alone without the other features and elements or in various combinations with or without other features and elements. In the above, a processor or processing unit may include, by way of example, a general-purpose processor, a special purpose processor, a conventional processor, a digital signal processor (DSP), a plurality of microprocessors, one or more microprocessors in association with a DSP core, and any other type of integrated circuit (IC).

Further, although applications of the positioning device have been described with reference to surveying systems, the invention may be used in other applications and/or systems.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method implemented in a positioning device for determining a geospatial position of an object, said method comprising:
    capturing, by an imaging device of said positioning device, at least one image of a surface;
    processing, by a processing unit of the positioning device, the at least one captured image for identifying candidate objects in said surface and for determining a nature of said candidate objects;
    displaying, at a display unit, the at least one captured image with a selection mechanism for assisting in selection of said candidate objects, wherein the at least one captured image is displayed and an indication of the determined nature of said candidate objects is overlaid on the displayed image, wherein for each of the candidate objects, the indication includes at least a first indication and a second indication of the determined nature, and wherein the first indication includes a different graphical representation than the second indication;
    receiving an input via the selection mechanism for selection of at least one of the candidate objects;
    collecting data from a global navigation satellite system (GNSS) receiving unit of the positioning device and data from said imaging device for a plurality of positions of said positioning device at which the selected object is viewed by the imaging device;
    determining, based on said collected data, orientations and positions of said positioning device for said plurality of positions of said positioning device in a global coordinate system (X1, Y1, Z1); and
    determining the geospatial position of the selected object in said global coordinate system based on the determined orientations and positions of the positioning device in the global coordinate system;
    wherein the positioning device includes (i) a first unit comprising the GNSS receiving unit and a holding element, and (ii) a second unit comprising the imaging device and the display unit, and wherein the holding element is adapted to receive the second unit.

2. The method of claim 1, wherein the geospatial position of the selected object is determined continuously as said data are collected.

3. The method of claim 1, wherein the geospatial position of the selected object is determined based on a determination of the geospatial position of the selected object for at least some of a plurality of locations from which data are collected from the GNSS receiving unit and the imaging device.

4. The method of claim 1, wherein the determination of the geospatial position of the selected object is stopped on a condition that an accuracy of the determined geospatial position of the selected object is reached.

5. The method of claim 4, further comprising displaying an indication to stop said collection of data.

6. The method of claim 5, wherein the indication includes the determined geospatial position of the selected object or instructions to stop the collection of data.

7. The method of claim 1, wherein the nature of the candidate objects is determined using an artificial neural network trained on previously captured images of objects and the corresponding nature of the objects.

8. The method of claim 7, further comprising updating said artificial neural network by communicating with a server configured to receive images and information about the nature of the candidate objects identified in the received images.

9. The method of claim 8, further comprising transmitting to the server said at least one captured image together with information about the nature of said candidate objects.

10. The method of claim 1, further including receiving an input from an operator for correction of the determined nature of one of said candidate objects and correcting the determined nature of said one of said candidate objects.

11. The method of claim 1, further comprising determining a subset of the candidate objects according to a predefined nature and displaying said subset with the selection mechanism.

12. The method of claim 1, further comprising storing the determined geospatial position and the determined nature of the selected object in said positioning device or transmitting the determined geospatial position and the determined nature of the selected object to a computing device.

13. The method of claim 1, wherein determining said orientations and positions of said positioning device for said plurality of positions of said positioning device in the global coordinate system includes:
   orientating, with respect to each other, a series of images captured with said imaging device and generating a 3D reconstruction of said selected object using the orientated captured images;
   obtaining positions of an antenna of said GNSS receiving unit in the global coordinate system for at least a subset of the captured images based on satellite information signals received at the GNSS antenna;
   defining a local coordinate system ($X_2$, $Y_2$, $Z_2$) and determining positions of the imaging device for at least some images of said subset in said local coordinate system; and
   determining a transformation function correlating a position of a point in the global coordinate system with a position of a point in the local coordinate system based on a known spatial position of the GNSS antenna relative to said imaging device within said positioning device when capturing each of said at least some images of said subset, the determined positions of the antenna in the global coordinate system and the corresponding positions of the imaging device in the local coordinate system for said at least some images of said subset.

14. The method of claim 13, wherein determining the geospatial position of the selected object in the global coordinate system includes determining the position of the selected object in the local coordinate system and determining the geospatial position of the selected object in the global coordinate system based on the determined position of the selected object in the local coordinate system and the determined transformation function.

15. The method of claim 1, further comprising collecting data from an inertial measurement unit (IMU) of said positioning device for the plurality of positions of said positioning device at which the selected object is viewed by the imaging device and providing the IMU data for determining the orientations and positions of said positioning device for said plurality of positions of said positioning device in the global coordinate system.

16. A portable positioning device adapted to obtain a geospatial position of an object, said portable positioning device comprising:
   a first unit comprising:
      a global navigation satellite system (GNSS) receiving unit adapted to receive satellite information signals from a GNSS; and
      a holding unit;
   a second unit comprising:
      an imaging device, wherein the imaging device is adapted to capture at least one image of a scene including said object;
      a display unit adapted to display the at least one captured image by the imaging device and a selection mechanism for assisting in selection of the object in the one or more displayed image, wherein the holding unit is adapted to receive the second unit; and
   a processing unit configured to:
      process the at least one image captured by the imaging device for identifying said object in said scene and for determining a nature of said object;
      cause displaying, at the display unit, of said at least one captured image with said selection mechanism, wherein the displayed image includes an indication of the determined nature of said object overlaid on the displayed image, wherein the indication includes at least a first indication and a second indication of the determined nature, and wherein the first indication includes a different graphical representation than the second indication;
      receive an input from the selection mechanism about selection of one candidate the object;
      cause the collection of data from the GNSS receiving unit and data from the imaging device for a plurality of positions of the positioning device at which the selected object is viewed by the imaging device; and
      determine, based on said collected data, orientations and positions of the positioning device for the plurality of positions of the positioning device in a global coordinate system (X1, Y1, Z1) and determine the geospatial position of the selected object in the global coordinate system based on the determined orientations and positions of the positioning device in the global coordinate system.

17. The positioning device of claim 16, wherein said positioning device is configured to operate in accordance with a method as defined in claim 1.

18. A method implemented in a positioning device for determining a geospatial position of an object, said method comprising:
   capturing, by an imaging device of said positioning device, at least one image of a surface;
   processing, by a processing unit of the positioning device, the at least one captured image for identifying the object in said surface and for determining a nature of said object;
   displaying, at a display unit, the at least one captured image with a selection mechanism for assisting in selection of said object, wherein the at least one captured image is displayed and an indication of the determined nature of said object is overlaid on the displayed image, wherein the indication includes at least a first indication and a second indication of the determined nature, and wherein the first indication includes a different graphical representation than the second indication;
   receiving an input via the selection mechanism for selection of the object;
   collecting data from a global navigation satellite system (GNSS) receiving unit of the positioning device and data from said imaging device for a plurality of positions of said positioning device at which the selected object is viewed by the imaging device;
   determining, based on said collected data, orientations and positions of said positioning device for said plurality of positions of said positioning device in a global coordinate system (X1, Y1, Z1); and
   determining the geospatial position of the selected object in said global coordinate system based on the determined orientations and positions of the positioning device in the global coordinate system.

* * * * *